Nov. 14, 1961 W. C. STEELE 3,008,542
APPARATUS FOR AND METHOD OF SUCTION CLEANING
Filed Oct. 23, 1959 3 Sheets-Sheet 1

INVENTOR.
WILLIAM C. STEELE
BY
Robinson + Berry
ATTORNEYS

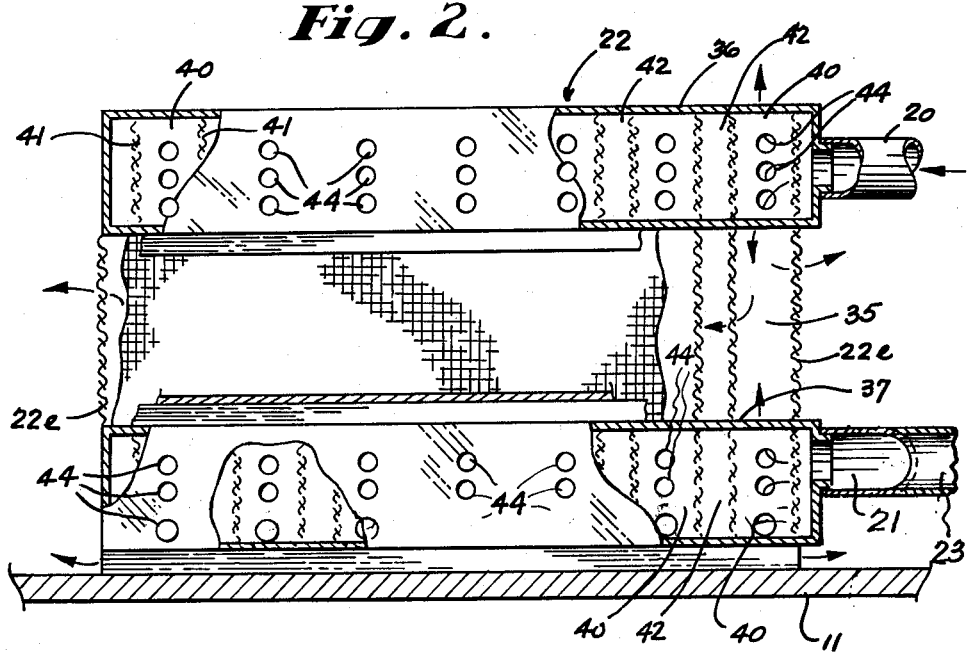
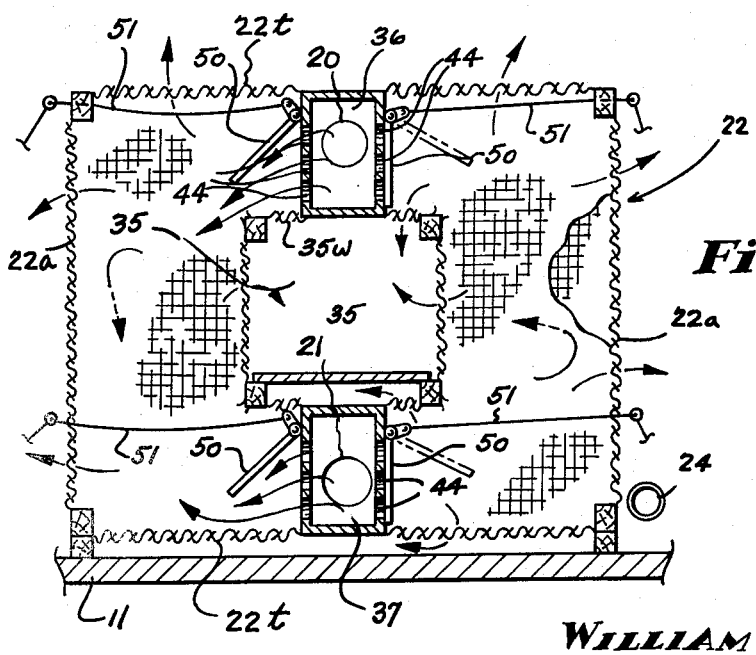

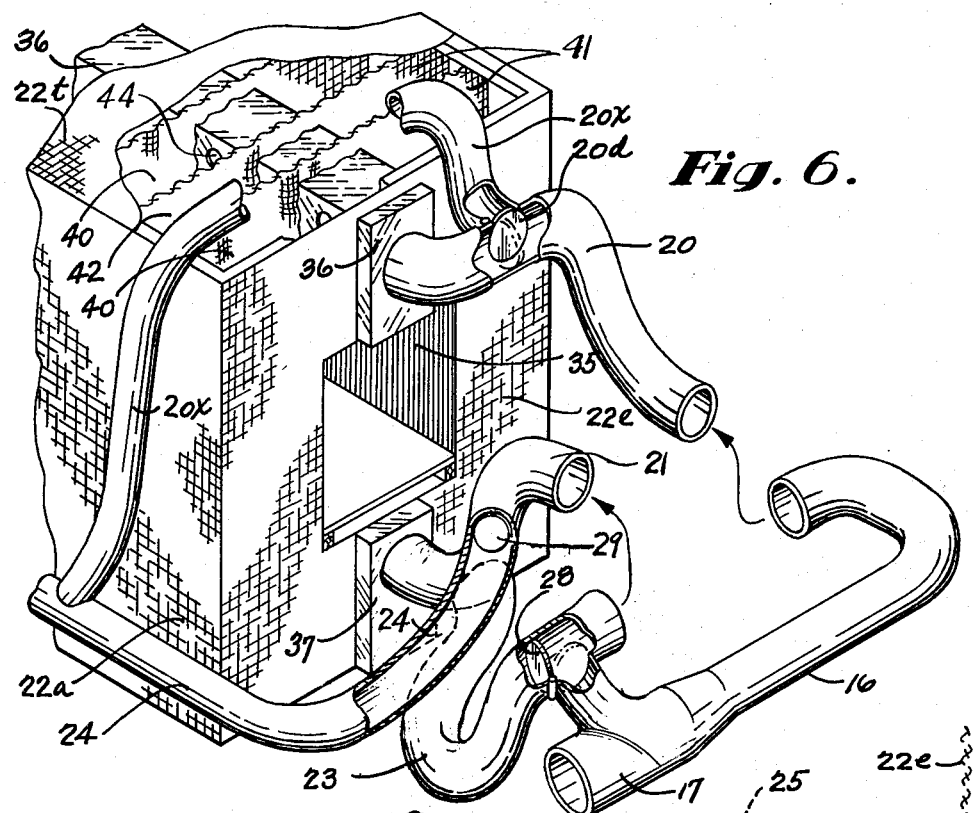
Fig. 6.
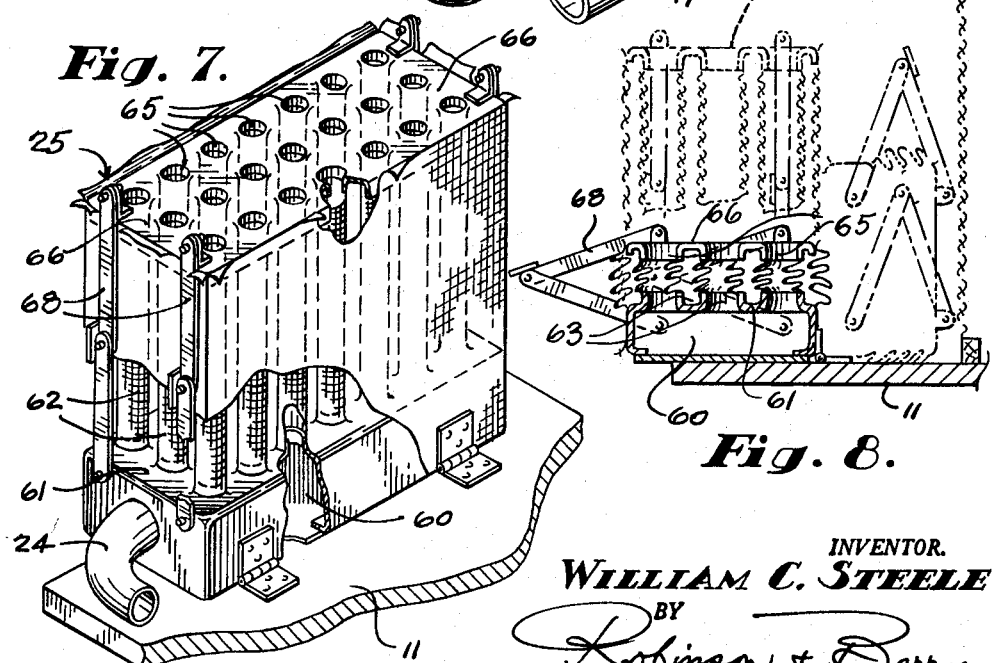
Fig. 7.
Fig. 8.
INVENTOR.
WILLIAM C. STEELE
BY
Robinson & Berry
ATTORNEYS United States Patent Office 3,008,542
Patented Nov. 14, 1961

3,008,542
APPARATUS FOR AND METHOD OF SUCTION CLEANING
William C. Steele, 3422 Albion Place, Seattle 3, Wash.
Filed Oct. 23, 1959, Ser. No. 848,273
7 Claims. (Cl. 183—34)

This invention relates to apparatus designed for the cleaning of ashes, soot, dust, lint and the like, any and all of which are hereinafter referred to as "dust," from furnaces, furnace housings and from air and smoke ducts of hot air or similar heating and ventilating systems of residences, stores and other business establishments.

More specifically stated, the present invention relates to improvements in mobile power operated cleaning apparatus that can be easily and readily moved from place to place; from residence to residence or building to building and quickly put into use.

It is the primary object of this invention to provide a practical and efficient apparatus of the above stated kind or character, employing a pair of suction blowers, a dust and air separator and a collector in conjunction with and featuring a novel arrangement of connecting ducts and adjustable dampers whereby air with its entrained dust may be caused to be drawn out from the housings, ducts or air channels of a system being cleaned and discharged into the separator for separation of the dust from the air, and then, after cleaning of the furnace has been completed, may by a readjustment of dampers the collected dust will be caused to be conveyed from the separator to the collector, for its ready disposal at a convenient time and place. Furthermore, it is an object to provide that the operation of transfer or removal of dust from the separator to the collector, will incidentally and simultaneously effect the suction cleaning of the separator.

It is also an object of the invention to provide a damper system that may be so adjusted as to cause delivery, during a furnace cleaning operation, of the air and entrained dust, in part or in whole, to the collector if such should be found desirable.

Still further objects and advantages of the invention reside in the novel details of construction and arrangement of parts embodied in the separator and in the collector and in their mode of use, as will hereinafter be fully described.

In accomplishing the above mentioned and other objects of the invention, I have provided the improved details of construction, the preferred forms of which are illustrated in the accompanying drawings, wherein:

FIG. 2 is a vertical, longitudinal section of the "Separator" portion of the apparatus, taken on line 2—2 in FIG. 1.

FIG. 3 is a transverse, vertical section of the separator, taken on line 3—3 in FIG. 1.

FIG. 6 is a perspective view of the forward end portion of the dust separator showing the connection of ducts therein with the blower system.

FIG. 7 is a perspective view showing the relationship of parts, making up the dust collector, during the delivery of dust thereto.

FIG. 8 is a view of the dust collector in a collapsed condition and as disposed during travel.

Figure 1:
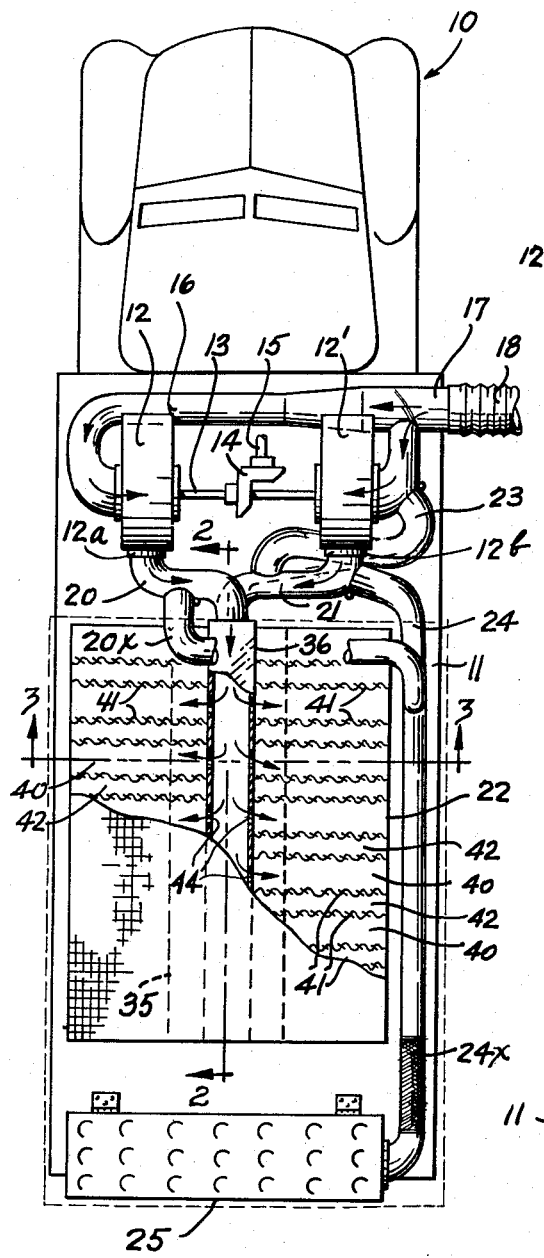
FIG. 1 is a plan or top view of a mobilized cleaning apparatus embodying the improvements of the present invention therein.

Referring more in detail to the drawings:

In FIG. 1, a mobile vehicle, preferably of automobile truck type, is designated in general by reference numeral 10. This vehicle, as shown only in plan view, is seen to comprise a horizontal bed or platform 11 of substantial and appropriate dimensions, on which the apparatus of this invention is functionally mounted. The apparatus, presently employed, comprises a pair of suction blowers, 12 and 12' of substantial volume, preferably of squirrel cage type, mounted axially in alignment transversely of the truck bed and adapted to be driven by a fan shaft 13 that is common to both and which has a driving connection, 14, between the blowers, with a power take-off shaft 15 which may be operatively connected with the truck engine, not shown or a separate motor.

The two suction blowers, 12 and 12', are of like capacity and have their suction sides or inlets connected, respectively, to opposite ends of a suction manifold 16 which has a tubular neck portion 17 with which the inner end of a flexible, tubular duct 18, of relatively large diameter, is connected; this being extended to and suitably connected with the furnace and duct system to be cleaned.

It has been shown in FIG. 1 that the rearwardly directed discharge outlets 12a and 12b of the blowers 12 and 12' are connected, respectively, to tubular delivery ducts 20 and 21 that lead to and discharge into certain ducts of the dust separator that, in FIG. 1, is designated in its entirety by reference numeral 22. The construction and mode of use of this separator will presently be described in detail.

Figure 4:
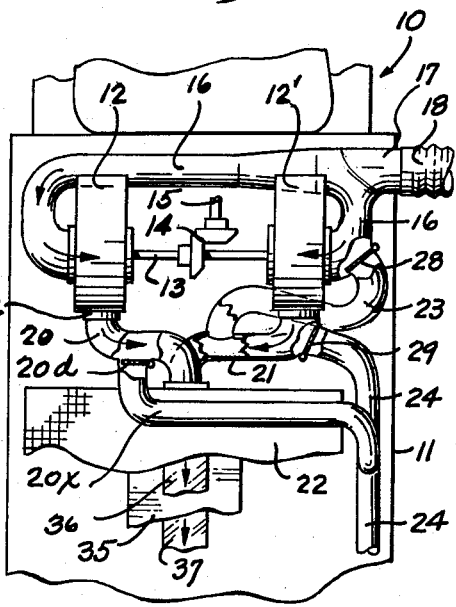
FIG. 4 is a fragmental view, in plan, showing the location of adjustable dampers in the blower duct system, as normally positioned for a furnace cleaning operation.
Figure 5:
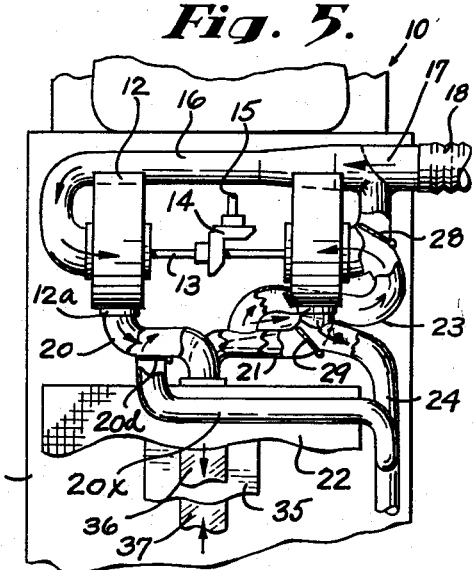
FIG. 5 is a similar view, showing the dampers as adjusted in the duct system for withdrawal of dust from the separator for its delivery to the collector.

It has been shown in FIGS. 1, 4 and 5, that a tubular duct 23 leads from the outer sidewall of that end portion of the manifold 16, leading to the blower 12' to the separator and is connected to discharge thereinto in a manner presently to be more fully explained. It is further shown in these figures that a tubular duct 24 leads from the duct 21 rearwardly along the separator to the entrance side of the collector 25 and is connected therewith in a manner and for a purpose presently fully explained. Collector 25 is seen in FIG. 1 to be located on the truck bed 11 rearwardly of separator 22 and its use and construction will later be described in detail.

One of the important features of the present invention resides in the use and connection of the manifold 16 and ducts 20, 21, 23 and 24, as associated with the two blowers and housings 22 and 25. Also, in the novel arrangement and coaction of the various dampers with these ducts. It has been shown in FIGS. 1, 3, 4 and 5 that the manifold 16 is tubular and is connected at its opposite ends with the intake sides of the blowers, respectively, thus to provide for the joint use of the blowers in cleaning a furnace system. It is further to be observed that the manifold 16 has the neck portion 17, which serves both blowers, joined with the flexible duct 18 that leads to the system to be cleaned. It is to be understood that the extent of duct 18 and its connections may be varied as required.

Hingedly mounted within the manifold 16, at the place of connection therewith of the duct 23, is a damper 28 which can be swingingly adjusted between a position closing the entrance to duct 23 as in FIG. 4, to a position directly across and closing the manifold 16, as in FIG. 5. It is also shown in FIG. 4 that a damper 29 is hinged in the entrance to duct 24 to swing between a position closed thereover to its position shown in FIG. 5 thus to close duct 21 as extended between blower 12' and the separator 22 and to connect blower 12' directly with duct 24.

For purposes presently apparent, a tubular duct 20x is extended from duct 20 to the duct 24, and in this duct 20x a damper 20d is mounted for variable adjustment between closed and open positions to permit unrestricted or partial delivery of air from blower 12 to duct 24 for a purpose presently apparent.

The described and illustrated arrangement of air ducts and dampers provides that, with damper 20d closed, the setting of dampers 28 and 29 in positions shown in FIG. 4, the normal operation of the blowers 12 and 12' will suck air from duct 18 and forcibly deliver it in its entirety into the separator 22 through ducts 20 and 21; this being the normal setting for furnace cleaning.

After cleaning a furnace or ventilating system, the dust deposited in the separator is transferred therefrom to the collector 25, requiring the adjustment of dampers 28 and 29 from their positions of FIG. 4 to that of FIG. 5. Upon adjusting the dampers 28 and 29 to the positions of FIG. 5, air will still be drawn from duct 18 by the blower 12 and blown into the separator 22 only through duct 20 but the blower 12' will now operate to suck air from separator 22 through duct 23 and forcibly deliver it into and through duct 24 into the collector 25. This operation will be more fully described after an explanation of the construction of the separator 22 and of the collector 25 has been given.

It is shown in FIGS. 2 and 3 that separator 22 comprises a housing of rectangular, box-like form. It has a skeleton frame structure of wood or metal to which opposite sidewalls 22a, opposite end walls 22e, and top and bottom walls 22t are applied. These walls are of a suitable fabric material through which air may be blown or drawn while any dust carried in the air will be retained thereon and separated from the air.

Located longitudinally of the box-like housing and centrally thereof as seen best in FIG. 3 is a duct 35 of rectangular cross-section which has top, bottom and sidewalls 35w of air pervious fabric. This duct 35 may be open at front and rear ends to conveniently serve as a storage space for the sections of duct 18 and tools during travel from place to place.

Located lengthwise of the housing 22, and also extending to its full length, centrally above and below duct 35, are air ducts 36 and 37, preferably of sheet metal or other air tight material. These ducts are relatively narrow in width but of substantial vertical height, as will be understood best by reference to their showing in FIG. 3. Ducts 36 and 37 are closed at their rear ends and at their forward ends are connected, respectively, with the discharge ends of ducts 20 and 21 which lead from blowers 12 and 12', as is well shown in FIG. 2.

It is further shown in FIGS. 1, 2 and 3 that the housing 22 is transversely divided into a plurality of alternating cells 40 and air channels 42 by parallel partitions 41 of fabric; these cells and channels are formed entirely about the duct 35.

The side wall of the sheet metal ducts 36 and 37 are each formed with a series of air holes or perforations 44 opening therefrom, in opposite directions into each of the cells 40. Thus, when dust laden air is forcibly discharged by the blowers 12 and 12' into the ducts 36 or 37, this air and entrained dust is discharged from the latter ducts through the air holes 44 into the air cells 40. The air escapes from these cells through the fabric partitions into the air channels 42 for escapement from the separator but the dust is retained by the fabric partitions. After the cleaning of a furnace or duct system of a residence, or the like, in the normal way has been finished, the damper adjustment may be changed from that of FIG. 4 to that of FIG. 5. Then the same blower operation provides that air will be drawn from the residence duct system by blower 12 and forcibly delivered into the duct 36 and from it to the several transverse air cells 40 while the blower 12' then operates to suck air from the separator cells 42 through the lower duct 36 and duct 23 and deliver it into duct 24 for its discharge into the collector 25. In this way, dust that is first drawn from the furnace system and discharged into the separator and retained by the fabric walls of air cells 40 will be freed from these walls, and conveyed or transferred to the collector 25 for later disposal. By this operation, the separator is cleaned and made ready for subsequent use.

It is further to be observed, see FIG. 3, that separate dampers 50 are hingedly suspended on the ducts 36 and 37 over each group of holes that opens from the ducts to the air cells 40. These dampers are free to swing open when air is blown into the ducts but each may be held in closed position by a pull cord 51 attached thereto and extended to readily accessible positions at opposite sides of the housing. In cleaning the dust from the individual cells, it is usually the case that all dampers except those associated with a particular cell, or group of cells are held closed so that the suction for cleaning can be concentrated on the selected cell or group of cells.

The collected dust, as sucked and blown from the separator and then blown through duct 24 into collector 25 is received within a horizontal compartment 60 of box form to which duct 24 leads. Extended upwardly from the top wall of this compartment is a plurality of elongated fabric filter tubes 62 in close arrangement which have their lower end portions fitted and secured about flanged openings 63 formed in the partition wall 61 and their upper end likewise secured to flanges about openings 65 in an upper and horizontal plate or wall 66. This plate may be held in the raised position as seen in FIG. 7 by hinged supporting legs 68 at its four corners; which legs may be collapsed to permit the downward collapsing of the filter bags against wall 61 as in FIG. 8. It will be understood that the dust laden air received in the compartment 60 from duct 24 will be deposited in and retained for the most part in the compartment 60 and the air discharged upwardly into the fabric filter tubes 62 for dissipation therethrough to outside atmosphere.

After this dust transfer and separator cleaning operation has been completed, the collected dust can be shaken out of the tubes into the lower compartment, the legs 68 and filter tubes collapsed against the wall 61 of the compartment and the unit then tipped upwardly against the rear end wall of the separator to conserve space and dust removed from the compartment through an end opening therein.

This upward hinging action of the part 60, as to the dotted line position in FIG. 8, requires that a short, tubular section 24x of fabric be interposed in duct 24, near its connection with compartment 60.

The apparatus, as thus designed and operated, provides for the fast, effective and satisfactory cleaning of the ducts of a furnace and heating and ventilating systems; the separation of the dust from the air; the transfer of dust from the separator to a collector with an incident cleaning of the separator and finally the disposition of dust from the collector. The system is relatively inexpensive, practical and is very satisfactory in use.

In addition to the various refinements in design and arrangement of parts forming the present apparatus, as previously explained and described, it is desirable and necessary to keep the housings and the dust retaining partitions, walls and tube associated therewith perfectly dry. To accomplish this, the separator 22 and collector 25 would be protectively covered with sheet plastic walls, spaced outwardly somewhat from the defining walls of these parts so as not to retard or interfere with free outflow or inflow of air, but amply protecting them against rain, snow or sleet. This will insure that the machine can operate satisfactorily in all kinds of weather.

It is further anticipated that all fabric walls that, because of the particular material used, therein, or because of the influence of air pressure or suction applied thereagainst might sag or become out of place, will be supported and retained in position by the use of small light weight rods of aluminum, wires, or the like, secured in the frame structure.

In summarizing the advantages in the use of the present mechanism, the following points should be mentioned:

First, the apparatus is readily portable and easily connected for functional use with present day heating or ventilating systems.

Second, it provides for retaining all removed dust in the collector until it is convenient to dispose of it.

Removal of dust from the collector and its disposition in the collector can be accomplished readily and easily without loss of dust and, incident to the operation of transferring dust from the separator to collector, the fabric walls of the collector will be cleaned of retained dust.

Third, the dust as drawn from the residential duct system can, if such is desired, be delivered directly in part or in its entirety into the collector.

Fourth, the change of the air system from residence cleaning to separator cleaning and transfer of dust to the collector can be accomplished easily and quickly merely by change in damper setting.

In order that the claims may be more easily understood and to avoid confusion in their interpretation, the paired suction blowers will be referred to, respectively, in reference to their proximity to duct 18, as the "first" and "second" suction blowers; the ducts 36 and 37 leading through the separator 22 will be referred to as "manifold ducts"; the duct 24 that leads to the collector 25 will be designated as a "disposal" duct; the duct 20x will be designated as a "disposal" duct and duct 23 will be referred to as the "reverse" flow duct.

What I claim as new is:

1. Cleaning apparatus of the character described comprising, in combination, a first and a second suction blower, a dust and air separator and a dust collector; each of said suction blowers having an intake duct adapted for connection with the system that is to be suction cleaned and having a discharge duct leading to said air and dust separator; said air and dust separator comprising an enclosure divided by air permeable partitions providing said enclosure with a succession of alternating cells and air escape passages, a pair of manifold ducts extending, in spaced relationship, through said separator cells and air escape passages and connected, respectively, with the discharge ducts of said first and second blowers; each of said manifold ducts having openings therefrom into each of said cells, a disposal duct leading from the discharge duct of one of said blowers to said dust collector, and dampers arranged in the ducts of the last referred to blower whereby it may be caused to suck air from the air and dust separator through the corresponding manifold duct and discharge it into said collector while the other blower continues to draw air from the system being cleaned and discharge it into the separator through the manifold duct corresponding thereto.

2. Cleaning apparatus of the character described comprising, in combination, first and second suction blowers operating in unison, a dust and air separator and a dust collector; each of said blowers having an intake duct adapted for connection with the system that is to be suction cleaned and each having a discharge duct leading to said air and dust separator; said air and dust separator comprising an enclosure divided by air permeable partition walls into a succession of alternating air cells and air escape passages, a pair of manifold ducts extended through the air and dust separator at top and bottom thereof and passing through the air cells and escape passages thereof and connected, respectively, to the discharge ducts of said first and second blowers; each of said manifold ducts having openings therefrom into each of the air cells, a disposal duct leading from the discharge duct of said first blower to said dust collector, a reverse flow duct leading into the intake duct of said first blower from a point in said discharge duct last referred to, that is between the point of connection of the disposal duct therewith and the connection of said discharge duct with the corresponding manifold duct, a damper mounted in the intake duct of the first blower and normally closing the outlet of the reverse flow duct, operable to shut off the indrawing of air by said first blower from the system being cleaned and to open the reverse flow duct, and another damper adjustably mounted in the discharge duct of the first blower to divert air through the reverse flow duct into said first blower for discharge by said blower through said disposal duct to said dust collector.

3. The combination recited in claim 2 wherein a second disposal duct leads from the discharge duct of said second blower to the disposal duct leading from the discharge duct of said first blower, and a damper is disposed in the discharge duct of the second blower to control the proportional amounts of air discharged therefrom into said second disposal duct and the manifold duct corresponding to said second blower.

4. The combination recited in claim 2 wherein separate dampers are applied to said manifold ducts to control the openings therein corresponding to the individual air cells; each damper having an adjusting means accessible from the outside of said separator.

5. The combination recited in claim 2 wherein said dust collector comprises a bottom compartment into which said disposal duct discharges and a plurality of separator tubes of air permeable material mounted on and opening at their lower ends into said bottom compartment.

6. The combination recited in claim 5 including also a top plate to which the upper ends of said tubes are joined for support, and collapsible means for the support of the plate to position for extension of said tubes or for their collapse against the lower compartment.

7. A cleaning apparatus comprising, in combination, a pair of suction blowers operating in unison; an air and dust separator and a dust collector; each of said blowers having an intake duct adapted for connection with a duct system to be suction cleaned and each having a discharge duct leading to the dust and air separator; said separator comprising an air permeable enclosure partitioned with air permeable walls into a succession of air cells and air escape ducts, a pair of manifold ducts leading through the housing and each of said cells and connected respectively, with the discharge ducts of the two blowers; each manifold duct having discharge openings into the cells, a disposal duct leading from each of the blower discharge ducts to discharge into the dust collector and dampers for controlling the first blower to suck and deliver air from the area being cleaned into the separator or to draw air from the separator through the corresponding manifold duct and deliver it to the collector, and whereby the second blower can be caused to deliver proportioned amounts of air sucked from the area being cleaned into the manifold duct corresponding to that blower and to the collector.

References Cited in the file of this patent

UNITED STATES PATENTS

| | | |
|---|---|---|
| 909,865 | Butler | Jan. 19, 1909 |
| 1,087,588 | Killman | Feb. 17, 1914 |
| 1,349,480 | Wilsmore | Aug. 10, 1920 |
| 1,356,086 | Plaisted | Oct. 19, 1920 |
| 1,538,292 | Lindsay | May 19, 1925 |
| 2,350,011 | Black | May 30, 1944 |
| 2,784,858 | Gebhardt | Mar. 12, 1957 |

FOREIGN PATENTS

| | | |
|---|---|---|
| 109,664 | Switzerland | July 1, 1925 |